United States Patent
Wingsch

(10) Patent No.: US 7,028,549 B2
(45) Date of Patent: Apr. 18, 2006

(54) HIGH-PRESSURE SENSOR, METHOD AND TOOL FOR ITS MANUFACTURE

(75) Inventor: Volker Wingsch, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 10/333,036

(22) PCT Filed: Jul. 13, 2001

(86) PCT No.: PCT/DE01/02558

§ 371 (c)(1),
(2), (4) Date: Jun. 30, 2003

(87) PCT Pub. No.: WO02/06784

PCT Pub. Date: Jan. 24, 2002

(65) Prior Publication Data

US 2004/0035210 A1   Feb. 26, 2004

(30) Foreign Application Priority Data

Jul. 15, 2000 (DE) .................. 100 34 460

(51) Int. Cl.
*G01L 7/08* (2006.01)
(52) U.S. Cl. ........................................ 73/715
(58) Field of Classification Search ................ 73/715, 73/706, 716, 718, 724
See application file for complete search history.

(56) References Cited

U.S. PATENT DOCUMENTS

| | | | | |
|---|---|---|---|---|
| 4,722,227 A * | 2/1988 | Grob et al. | .................... | 73/706 |
| 4,735,091 A * | 4/1988 | Engeler et al. | ................ | 73/756 |
| 4,819,487 A * | 4/1989 | Wareham | ....................... | 73/726 |
| 4,926,396 A * | 5/1990 | Robertson | .................... | 367/159 |
| 4,982,608 A * | 1/1991 | Marki et al. | ................... | 73/756 |
| 5,068,503 A * | 11/1991 | Sladky | ....................... | 200/83 L |
| 5,581,226 A * | 12/1996 | Shah | ........................... | 338/42 |
| 5,827,972 A * | 10/1998 | Balcarek et al. | .............. | 73/756 |
| 6,092,426 A * | 7/2000 | Vollenweider et al. | ........ | 73/756 |
| 6,209,397 B1 * | 4/2001 | Heller et al. | ................... | 73/706 |
| 6,725,724 B1 * | 4/2004 | Gluck | ......................... | 73/715 |
| 6,742,397 B1 * | 6/2004 | Parker | ........................ | 73/756 |
| 2002/0184955 A1 * | 12/2002 | Parker | ........................ | 73/756 |
| 2003/0024763 A1 * | 2/2003 | Hachiya et al. | ............. | 181/169 |
| 2004/0035210 A1 * | 2/2004 | Wingsch | ...................... | 73/700 |
| 2004/0200286 A1 * | 10/2004 | Mast | ........................... | 73/715 |

FOREIGN PATENT DOCUMENTS

| DE | 34 20 004 | 9/1982 |
|---|---|---|
| GB | 10 88 723 | 10/1967 |
| WO | WO 94 25 843 | 11/1994 |

* cited by examiner

*Primary Examiner*—William Oen
*Assistant Examiner*—Andre Allen
(74) *Attorney, Agent, or Firm*—Kenyon & Kenyon

(57) ABSTRACT

A high-pressure sensor includes a deformation member and connection piece that is joined to the deformation member by a welded seal. The deformation member has a truncated-cone-shaped circumferential segment, via which a welding current can be supplied, in order to weld the two pieces to each other in response to a simultaneous pressing together of deformation member and pressure connection piece. A welding electrode that is configured in a cup shape having a spring-loaded nonconductive insert that can be axially displaced in the interior of the cup.

9 Claims, 2 Drawing Sheets

HIGH-PRESSURE SENSOR, METHOD AND TOOL FOR ITS MANUFACTURE

FIELD OF THE INVENTION

The present invention relates to a high-pressure sensor, as well as to a method and tool for its manufacture.

BACKGROUND INFORMATION

High-pressure sensors are used in numerous application areas in the automobile industry. For example, they are used in injection systems, anti-lock braking systems, driving dynamics control systems, and in other systems.

Conventional high-pressure sensors include a deformation member, also termed substrate, on which, using thin-layer technology, a layer system is deposited made up of an insulation layer, for example, composed of silicon oxide, a patterned functional layer, for example, made of poly-Si or NiCr, a contacting field and a passivation layer. The functional layer transforms a mechanical deformation of a diaphragm of the deformation member into an electrical signal.

The sensor, made up of the deformation member and the deposited thin layer, is subsequently assembled along with a pressure connection piece and an injection-molded housing, it is provided with contacts, and, if appropriate, it is furnished with evaluation electronics, thus constituting a complete high-pressure sensor.

One step in the manufacture of the high-pressure sensor is joining the pressure connection piece and the deformation member. This bond should be a tight seal, so that the pressure medium that is conveyed to the deformation member via the pressure connection piece does not escape through a leak in the welded seal. Furthermore, the bond should also be as free of stress as possible so that internal stresses of the deformation member caused by the welding process do not falsify its measuring signal and/or lead to an uncontrolled divergence with regard to sensitivity and response behavior in mass-produced pressure sensors.

At present, for welding pressure connection pieces and deformation members, the method of electron beam welding is generally used. This method is relatively expensive because it must be carried out in a vacuum, and it requires a great deal of processing time because, for each individual high-pressure sensor, the electron beam must be directed over its entire periphery in order to produce a closed welded seal. In this context, there also arises the problem that, as a consequence of the different thermal conditions at the beginning and at the end of the welding process, stresses are not distributed uniformly over the circumference of the welded seal. In addition, electron beam welding results in the production of burn-off, which must be removed in a time-consuming and costly manner.

A simple and cost-effective alternative to electron beam welding is resistance welding. However, this method has the disadvantage that to impress the welding current into the tool, a contact surface is required through which pressure is exerted on the object to be welded, and the surface cannot be too small in order to prevent an overheating of the contact area by the welding current that is supplied. To produce a contact area of this type in sufficient size, the deformation member is enlarged laterally, which results in a decrease in the yield of deformation members that could be manufactured from a wafer of a given size. In addition, it is believed that the number of deformation members that could be processed together in one coating procedure is smaller as a result, so that the cost reductions achieved during assembly by a simpler welding method are more than offset by the added expense in the manufacture of the deformation members.

SUMMARY OF THE INVENTION

A high-pressure sensor according to the present invention provides an inexpensive resistance welding of the connection between the deformation member and the pressure connection piece, at a minimal use of wafer surface. In particular, the surface area required is not more than in the case of conventional electron beam welding, and it is less than in the case of resistance welding over a bond that is 1 mm wide.

According to an exemplary embodiment, a high-pressure sensor includes a deformation member and a connection piece connected to the deformation member by a welded seal. The deformation member has a truncated-cone-shaped circumferential segment, through which a welding current can be directed to the deformation member.

According to a further exemplary embodiment, a truncated-cone-shaped circumferential segment of this type can be configured so as to converge towards the pressure connection piece, so that an electrode that is shaped so as to complement the circumferential segment can be placed directly onto the truncated-cone-shaped circumferential segment for conducting the welding current.

According to a particular embodiment, the truncated-cone-shaped circumferential segment converges towards the pressure connection piece. Even though this does not provide for a direct placing of the electrode on the deformation member, the current may be initially conveyed from the electrode to a contact ring and from this to the deformation member via the truncated-cone-shaped circumferential segment that contacts the contact ring. Depending on the configuration of the high-pressure sensor, the contact ring can remain on the deformation member, or it may be removed after the termination of the welding process.

According to another exemplary embodiment, the deformation member advantageously has a circumferential collar, which simplifies the handling of the deformation member during its manufacture. In this case, the truncated-cone-shaped circumferential segment may be situated advantageously between the collar and the welded seal so as to save space. The width of the collar may be between 0.25 and 0.4 mm. This collar is designed for handling and is not used for impressing the welding current.

To avoid excessive heating and potentially an unintended welding of the contact ring to the deformation member, the surface of the truncated-cone-shaped circumferential segment may be greater than the cross-sectional surface of the welded seal.

According to a further exemplary embodiment, the contact ring is advantageously mounted on the truncated-cone shaped segment, without a direct conductive connection to the pressure connection piece, so that a welding current that is supplied via the contact ring is forced to flow entirely through a contact area between the deformation member and the pressure connection piece, where the welded seal is to be created.

When material is melted at the welded seal, the result is that the deformation member and the contact ring are displaced downwards in response to the welding. In order, in response to this shift, to exert a defined counterpressure against the pressure of the electrode on the contact ring, it is provided, according to an exemplary implementation, to mount a spring washer on the side of the contact ring that is facing the welded seal. This spring washer may be made of an elastic material that is not electrically conductive, such as hard rubber.

According to an exemplary method for manufacturing a high pressure sensor according to the present invention, the deformation member and the connection piece are pressed against each other, and an electrical welding current is conveyed from the contact ring through the deformation member to the connection piece, to create a welded seal between the deformation member and the connection piece. In this manner, the welded seal is created on the entire circumference of the connection piece and of the deformation member simultaneously, i.e., the thermal conditions of its production are identical over the entire circumference. The residual stresses that remain after the welding process between the connection piece and the deformation member can therefore be kept at a very low level in comparison to electron beam welding, thus improving the precision of the sensors that are manufactured in accordance with the method and reducing the divergence of their properties.

The welding electrode may be advantageously placed onto the contact without contacting the deformation member, in order to supply welding current to the contact ring. The welding electrode can therefore exert great pressure on the contact ring and thus keep the electrical contact resistance between the electrode and the contact ring at a low level, without running the danger of damaging the deformation member as a result of the pressure exerted.

According to a particular embodiment, in order to prevent an indirect current flow between the electrode and the deformation member, it is advantageous that, before supplying the welding current, an insulating apron is introduced between the exterior circumference of the deformation member and the welding electrode that surrounds it in an annular fashion.

In order to exert the pressure of the deformation member against the connection piece, it is believed to be advantageous to provide a non-conductive insert of the welding electrode. To avoid stressing the sensitive thin-layer system of the deformation member, this insert exerts the force on a radially exterior area of the deformation member, such as its collar.

According to an advantageous implementation, the insert may be spring-loaded.

DETAILED DESCRIPTION

Figure 1:
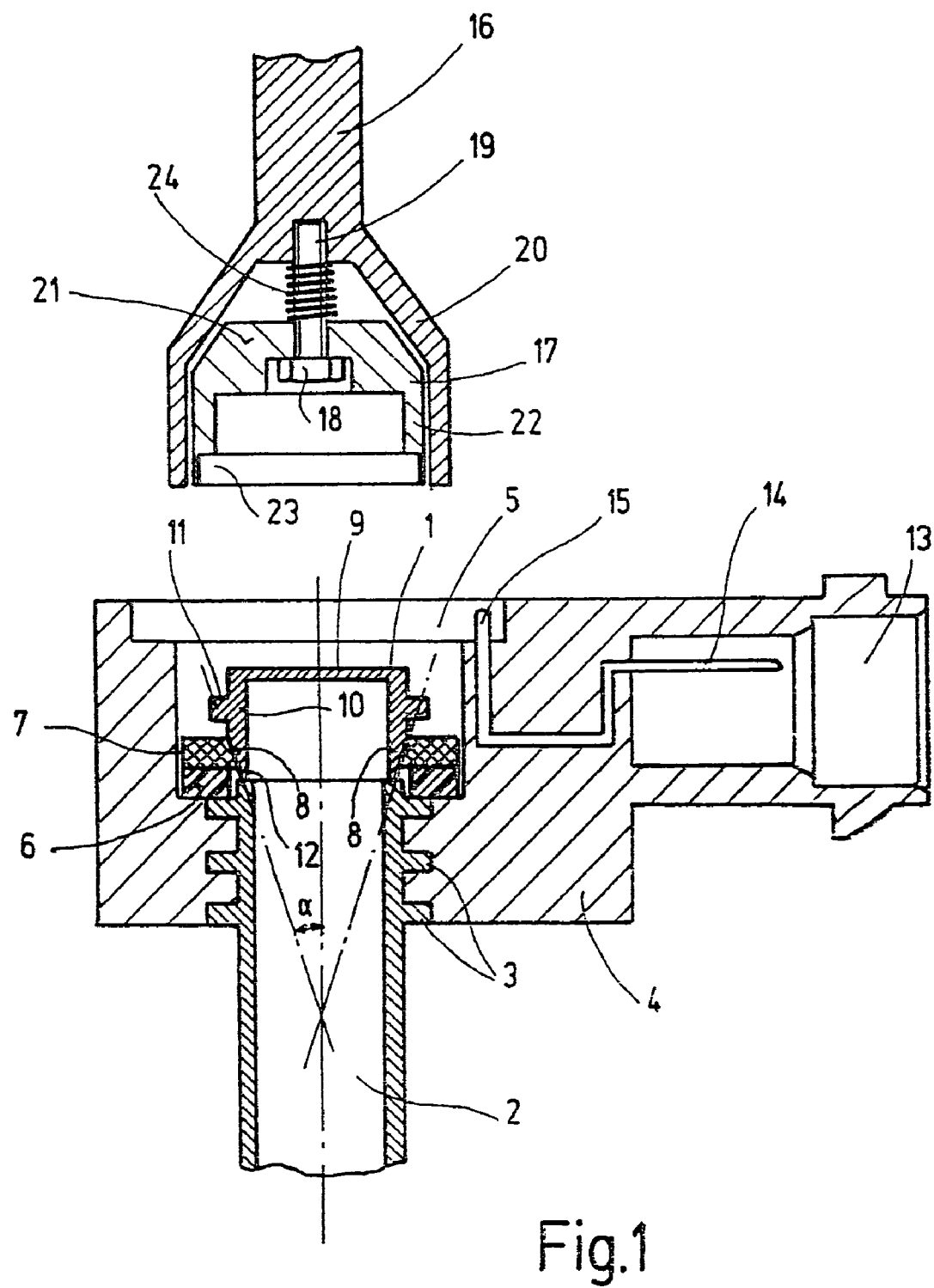
FIG. 1 depicts a high pressure sensor according to an exemplary embodiment of the present invention in a cutaway section before welding of the deformation member and the connection piece.

The high-pressure sensor depicted by way of example in FIG. 1 includes a pressure connection piece 2, which, at the end depicted in the Figure, has a plurality of circumferential ribs 3. Pressure connection piece 2 is anchored in an injection-molded housing 4 by ribs 3.

Housing 4 has a recess 5 on its rear side facing away from pressure connection piece 2, situated on top in FIG. 1. Mounted at the base of this recess 5 is a spring washer 6 made of hard rubber. On spring washer 6 is a contact ring 7 made of a soft metal that is electrically conductive. Ring 7 can be made of, for example, a copper, such as soft-annealed copper, or alternatively aluminum, tin, lead, for example, and, if appropriate, the contact ring may have a rare-metal coating to improve the electrical contact. Contact ring 7 may have a truncated-cone-shaped inner circumferential surface, which contacts a complementarily formed, truncated-cone-shaped circumferential segment 8 of a deformation member 1.

Deformation member 1 has the shape of a reverse cup or crucible having a thin-wall base 9, which can be shaped under the influence of a pressure that is exerted by pressure connection piece 2 in the finished high-pressure sensor, and having a circumferential wall 10. The thickness of wall 10 is substantial in comparison to that of base 9, because a groove (not depicted in the Figure) is introduced in it, the groove being designed to act as a rotation lock for deformation member 1.

Truncated-cone-shaped circumferential segment 8 is situated on side wall 10 between a circumferential collar 11 and lower edge 12 of deformation member 1, which presses against pressure connection piece 2. The width of the collar in the radial direction is approximately 0.5 mm. A spread angle α of the cone is approximately 10°.

Base 9 of the deformation member supports a layer system (not depicted in the Figure), which is generated using thin-layer technology, and it includes an insulation layer, a patterned functional layer, whose electrical properties can be modified by deforming base 9, a passivation layer, and contacting fields.

Housing 4 has a connector 13, that is designed in one piece and that has contact pins 14, which are extrusion-coated over a portion of their length using the plastic mass of housing 4 and which discharge in one end 15 into recess 5, so as, in a further manufacturing step, to be bonded there to the contacting fields of the functional layer.

Above recess 5, an electrode 16 is depicted, which makes it possible to create a welded seal between deformation member 1 and pressure connection piece 2 in the area of edge 12. This electrode essentially has the shape of a cup 20 having a shank that is connected to the base (here running to a cone-shaped end) of the cup made of a highly electrically conductive metal and an electrically insulated insert 17 that is mounted in the interior of cup 20. A screw 18 extends through the bore of insert 17 and engages with threaded bore 19 in the base area of cup 20 of electrode 16. A powerful coil spring 24, that is mounted around screw 18, exerts a downward force on insert 17 and thus holds it in tension between itself and the head of screw 18.

Insert 17 essentially includes a strong base plate 21, an annular segment 22 that is shaped to the exterior circumference of the latter, and a thin-wall apron 23 that extends the annular segment in the downward direction.

Figure 2:
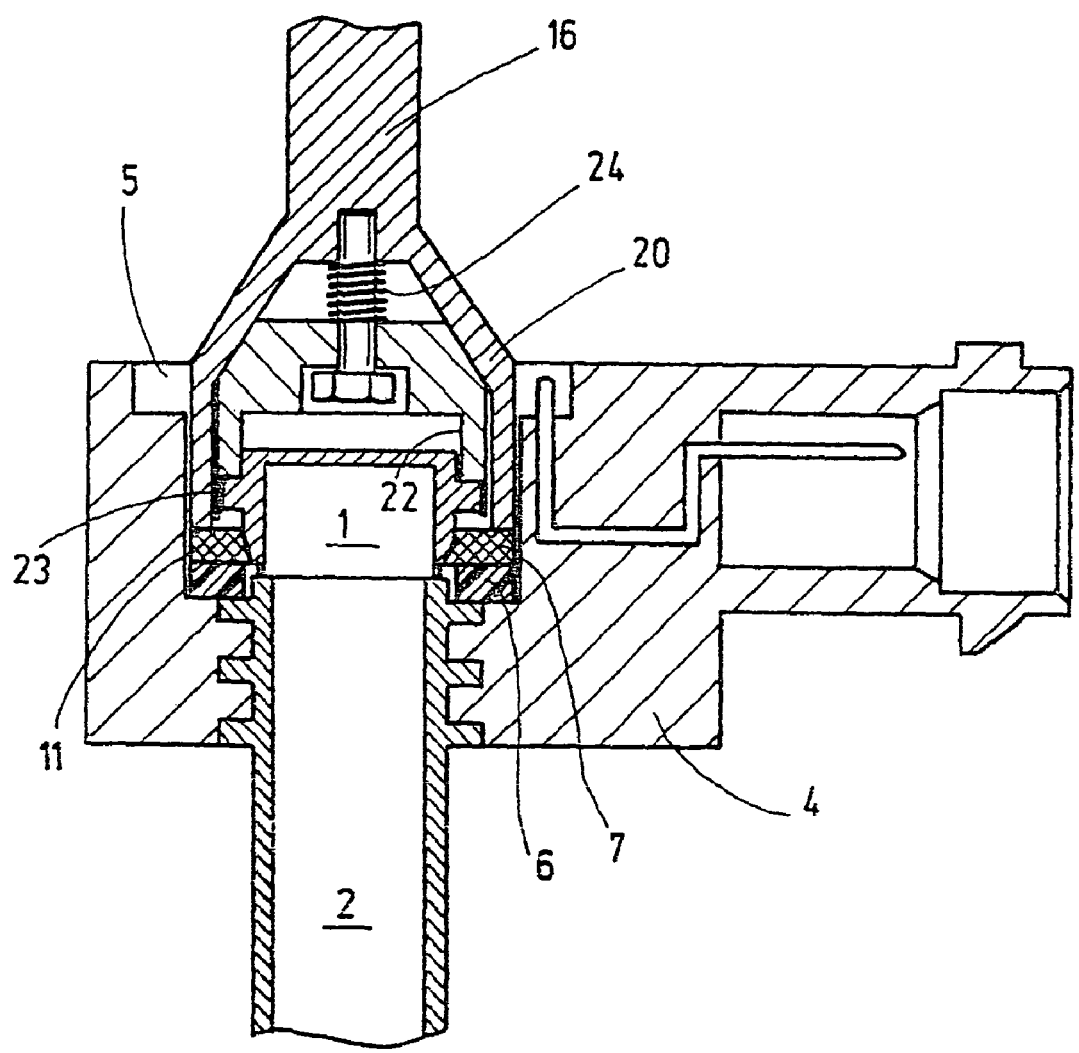
FIG. 2 depicts the high pressure sensor of FIG. 1 after welding.

FIG. 2 depicts electrode 16 as engaged in recess 5 of housing 4. The exterior diameter of the cup of electrode 16 corresponds to the interior diameter of recess 5 so as to permit a small amount of play, allowing electrode 16 to be inserted into recess 5. When electrode 16 is lowered from the position depicted in FIG. 1, initially the lower edge of annular segment 22 comes into contact with collar 11, apron 23 enclosing collar 11 in an annular fashion. In this way, apron 23 prevents an electrically conductive contact from occurring between electrode 16 and deformation member 1.

As electrode 16 continues to be lowered into the position depicted in FIG. 2, spiral spring 24 is compressed, and its force is transmitted via insert 17 to collar 11 and from there to truncated-cone-shaped circumferential segment 8, which contacts contact ring 7. Finally, when the lower edge of cup 20 electrode 16 contacts contact ring 7, then a welding current can flow from electrode 16 through contact ring 7 and side wall 10 of deformation member 1 into pressure connection piece 2.

The diameter of contact ring 7, or of its contact cross-section with respect to electrode 16, can be dimensioned adjustably, and it is believed that any welding of electrode 16 onto the contact ring or any burning off of the electrode can thus be reliably avoided, without resulting in substantial additional costs in manufacturing the high-pressure sensor according to the present invention. If, instead, the welding current had to be applied directly from the electrode to deformation member 1, then this would require an enlargement of the cross-sectional surface of the latter, and the number of deformation members that could be manufactured from one single substrate, or that could be provided with sensor layer systems in one single thin-layer process would decline, which it is believed would make manufacturing the individual deformation members correspondingly more expensive.

Just as in the case of the contact surface between electrode 16 and contact ring 7, in the case of the high-pressure sensor according to the present invention, the contact surface between contact ring 7 and deformation member 1 can also, without difficulty, be made large enough in the area of truncated-cone-shaped circumferential segment 8 so as to be able to reliably prevent the two parts from being welded together. Thus it is assured that the power of the welding current essentially falls off at the transition between deformation member 1 and pressure connection piece 2, whose cross-section is significantly smaller than the contact surfaces between electrode 16 and contact ring 7, or between contact ring 7 and deformation member 1.

The force with which electrode 16 is pressed is calculated so that, as a result of the force of compressed spring 24, deformation member 1 is securely pressed against contact ring 7 and, if appropriate, the lower edge 12 of the deformation member is pressed against pressure connection piece 2, while slightly deforming spring washer 6. In comparison thereto, the force transmitted directly from the edge of cup 20 of electrode 16 to contact ring 7 is small, so that it does not bring about any further compression of spring washer 6, which could impair the contact between the truncated-cone-shaped surfaces of contact ring 7 and deformation body 1. If the welding current is subsequently conveyed through the deformation member and brings about a melting of it in the area of lower edge 12, then this makes it possible for spring 24 to slightly compress deformation member 1 in the area of the welded seam that is being created, and thus to unbend. The setting motion of compression member 1 that is brought about in this way, along with a simultaneous further compression of spring washer 6, terminates the conductive contact between cup 20 of electrode 16 and contact ring 7, so that the welding current automatically breaks off after a successful fusing.

In one alternative configuration, it is also possible to use an electrode that has a fixedly joined nonconductive insert. In this case, the dimensional stability of the insert and of deformation member 1 is tightly controlled in order to assure that the insert does not meet deformation member 1 too soon and thus prevent an electrical contact between the cup of the electrode and contact ring 7, or that a premature contact between the cup of the electrode and contact ring 7 does not bring about a compression of spring washer 6 and therefore potentially an impairment of the contact between contact ring 7 and truncated-cone-shaped circumferential segment 8.

What is claimed is:

1. A high-pressure sensor comprising:
    a deformation member including a truncated-cone-shaped circumferential segment; and a pressure connection piece joined to the deformation member by a welded seal; wherein the truncated-cone-shaped circumferential segment converges towards the pressure connection piece; and
    an electrically conductive contact ring that is mounted on the truncated-cone-shaped circumferential segment without a direct conductive connection to the pressure connection piece.

2. The high-pressure sensor of claim 1, wherein the truncated-cone-shaped circumferential segment has a spread angle of between 5 and 20 degrees.

3. The high-pressure sensor of claim 1, wherein the truncated-cone-shaped circumferential segment has a spread angle of approximately 10 degrees.

4. The high-pressure sensor of claim 1, wherein the deformation member includes a circumferential collar, and the truncated-cone-shaped circumferential segment is situated between the collar and the welded seal.

5. The high-pressure sensor of claim 4, wherein the circumferential collar has a width between 0.25 and 0.75 mm.

6. The high-pressure sensor of claim 4, wherein the circumferential collar has a width between 0.4 and 0.6 mm.

7. The high-pressure sensor of claim 1, wherein a surface of the truncated-cone-shaped circumferential segment is larger than a cross-sectional surface of the welded seal.

8. The high-pressure sensor of claim 1, further comprising: a spring washer mounted on a side of the contact ring facing the welded seal.

9. The high-pressure sensor of claim 8, wherein the spring washer includes an elastic nonconductive material.

* * * * *